United States Patent
Shaffer et al.

(10) Patent No.: US 6,389,181 B2
(45) Date of Patent: *May 14, 2002

(54) PHOTOCOLLAGE GENERATION AND MODIFICATION USING IMAGE RECOGNITION

(75) Inventors: Stephen L. Shaffer, Penfield; John R. Squilla; John K. McBride, both of Rochester, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,639

(22) Filed: Nov. 25, 1998

(51) Int. Cl.$^7$ .................................................. G06K 9/60
(52) U.S. Cl. ..................... 382/305; 382/306; 382/307; 358/403; 707/1; 707/102
(58) Field of Search ................................ 382/305, 276, 382/170, 172, 302, 306, 307; 358/448, 906, 450, 400, 402, 403; 345/619, 630; 707/1, 7, 102, 100

(56) References Cited

U.S. PATENT DOCUMENTS

| | | | |
|---|---|---|---|
| 4,888,648 A | * 12/1989 | Takeuchi et al. ............. | 358/335 |
| 5,041,921 A | 8/1991 | Scheffler ...................... | 360/13 |
| 5,126,779 A | 6/1992 | Maitani ....................... | 354/442 |
| 5,128,525 A | 7/1992 | Stearns et al. ............... | 235/454 |
| 5,403,138 A | 4/1995 | Otake et al. .................. | 412/1 |
| 5,418,654 A | * 5/1995 | Scheffler ...................... | 360/13 |
| 5,454,678 A | 10/1995 | Hefty ........................... | 412/1 |
| 5,563,722 A | 10/1996 | Norris ......................... | 358/453 |
| 5,576,759 A | 11/1996 | Kawamura et al. .......... | 348/231 |
| 5,636,292 A | 6/1997 | Rhoads ....................... | 382/232 |
| 5,734,916 A | 3/1998 | Greenfield et al. .......... | 395/792 |
| 5,751,286 A | 5/1998 | Barber et al. ................ | 345/348 |
| 5,761,655 A | 6/1998 | Hoffman ....................... | 707/4 |
| 5,784,461 A | 7/1998 | Shaffer et al. ................ | 380/21 |
| 5,895,464 A | * 4/1999 | Bhandari et al. ............. | 707/3 |

OTHER PUBLICATIONS

"Consumers test–drive Image Magic system on the Internet" from Internet. http://home.kodak.com/kodakworld/news/html/kodakery/980423/980423.image.magic.html.

"Photonet" of PictureVision Inc. From Internet http://www.photonet.com/, Jul. 16, 1998.

Picture It of Microsoft. From Internet http://www.wn.com.au/gol/computers/software–scene/Piclt.htm, Jul. 16, 1998.

"Put those old family photos to good use with album program". Creative Photo Albums from DogByte Development. From Internet http://www.jacksonville.com/tu–online/stories/041998/bus_TECH_sof.html.

(List continued on next page.)

Primary Examiner—Bhavesh Mehta
Assistant Examiner—Yosef Kassa
(74) Attorney, Agent, or Firm—Peyton C. Watkins

(57) ABSTRACT

A method and system for employing image recognition techniques to produce a photocollage from a plurality of images wherein the system obtains a digital record for each of the plurality of images, assigns each of the digital records a unique identifier and stories the digital records in a database; automatically sorts the digital records using at least one date type to categorize each of the digital records according at least one predetermined criteria; employs means responsive to the sorting step to compose a photocollage from the digital records. The method and system employ data types selected from pixel data; metadata; product order information; processing goal information; or customer profile to automatically sort data typically by culling or grouping to categorize according to either an event, a person, or chronologically.

21 Claims, 4 Drawing Sheets

OTHER PUBLICATIONS

Madirakshi Das, et al., "FOCUS: Search for Multi–colored Objects in a Diverse Image Database", Proceedings of the IEEE Computer Society Conference On Computer Vision and Pattern Recognition, US, Los Alamitos, IEEE Comp. Soc. Press, vol. Conf. 16, pp. 756–761. XP000776573, ISBN: 0–7803–4236–4.

* cited by examiner

PHOTOCOLLAGE GENERATION AND MODIFICATION USING IMAGE RECOGNITION

FIELD OF THE INVENTION

The invention relates generally to the field of photography, and in particular to photo collections. More specifically, the invention relates to employing image recognition techniques for generating photocollages automatically.

BACKGROUND OF THE INVENTION

Photographs, videos, and memorabilia collections are very commonly used to maintain memories and events that formed a part of a persons life. These collections serve to augment the human memory and enrich the process of sharing stories related to the memories. When organized, viewed and shared on a regular basis a collection of memory artifacts generates a large reward, enriching the lives of all involved. The nature of these collections is such that they grow steadily, event by event, year by year, and soon become large and difficult to manage. Collections of photos and memorabilia are considered one of the most important and valued possessions by most people. They are the first things that people think of when forced to flee their homes due to fire, flood or other natural disaster. These collections possess intrinsic, emotional value, even if they are never viewed, because the need to preserve a memory of life is strong and universal. Because of the relative importance of these memories to the persons involved, the prior art is replete with teachings that disclose organizational methods.

The most common manner of organizing these collections within the prior art is to place the photos, videos or memorabilia into either an album or a box. Common vinyl album pages provide the means to store and view between one and five standard sized photos per page. Creative people often spend hours carefully selecting and arranging photos, writing captions, clipping newspaper articles, and other memorabilia to create visual stories or scrapbooks. Once organized into groups or pages these photocollages greatly enhance a person's ability to remember and share the story surrounding the depicted events. These simple organization tools allow the collections to be easily viewed and also serves to protect the artifacts themselves. There are numerous types of albums and boxes available in the market today, ranging from simple vinyl sleeves to boxes manufactured from specialized materials designed to preserve the artifacts. Album vendors include Pioneer Photo Albums, Design Vinyl and Cason-Talens. Box vendors include Exposures. None of these prior art disclosures provide a means by which a photocollage of these memorable events can be easily constructed by persons to who these event means so much.

As used herein photocollage refers to a single page having a plurality of images, such as a page in a photo album, or a composite image having a number of images relating to a single theme such as a vacation, wedding, birthday party or the like. The concept of photocollage as used herein also includes the concept of a bound photo album having a plurality of pages, one or more of which is a photocollage. Despite the fact that many people are engaged in collecting these memorable artifacts, few people have the free time available to invest on a regular basis to organize and maintain them. Before long, the amount of unorganized material becomes a significant psychological barrier to getting organized. Other barriers exist which prevent people from actively maintaining these memorabilia collections such as confidence in their process, access to the materials, or remembering the details about the event. Often, once people get started on this organizational task they find it rewarding and fun, but still a significant amount of work.

Many attempts have been made to provide tools for working with or organizing photo and memorabilia collections. Computer software programs such as Picture-It™, by Microsoft, or Creative Photo Albums™, by Dog Byte Development, allow people to work with digital versions of their photos and create digital versions of an album or print them on a home printer. Software products such as these require each photo or artifact exist in digital form before they can be used. Although these products increase the ability to change and enhance photos and scanned memorabilia they do not reduce the amount of work needed to organize collections or create visual stories. Other services such as Photo-Net™ by PictureVision™ will scan photographs in a high-quality format at the time of photo processing and provide a thumbnail image of the scanned images via the Internet. A customer, using these scanned images can create collections of photos which can be viewed on the Internet or have prints generated. Currently some of these services do not allow for the arrangement of several photos on a page and are limited to consumers who have a collection of digital images and a computer connected to the Internet and who are both computer and web literate.

It should be apparent from the foregoing discussion that there remains a need within the art for a method by which consumers can create photocollages and photo albums (or have them made for them) in a manner that is as simple as ordering prints.

SUMMARY OF THE INVENTION

The present invention addresses the need for an improved method of generating photo albums from consumer photographs that requires a minimum amount of effort but yields a high-quality product and is reasonably priced.

The present invention is directed to overcoming one or more of the problems set forth above. Briefly summarized, according to one aspect of the present invention, a system and method for producing a photocollage from a plurality of images, comprising the steps of: a) obtaining a digital record for each of the plurality of images, each of the digital records having a unique identifier and storing the digital records in a database; b) automatically sorting the digital records using at least one date type to categorize each of the digital records according at least one predetermined criteria; c) employing means responsive to the sorting step to compose a photocollage from the digital records. The system then associates each of the images with at least one of the categories followed by a sorting step that arranges the images according to the categories. The system then employs the categories to automatically construct the photocollage from the stored images by generating a plurality of pages of the stored images.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages: Allows the user to have (1) an easy method for creating professional looking photocollages, (2) duplication of photocollages, and (3) keeping photocollage files for later use.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

An acceptable photo album or photocollage can be created automatically from customers' exposed film, negatives, or digital images.

Figure 1:
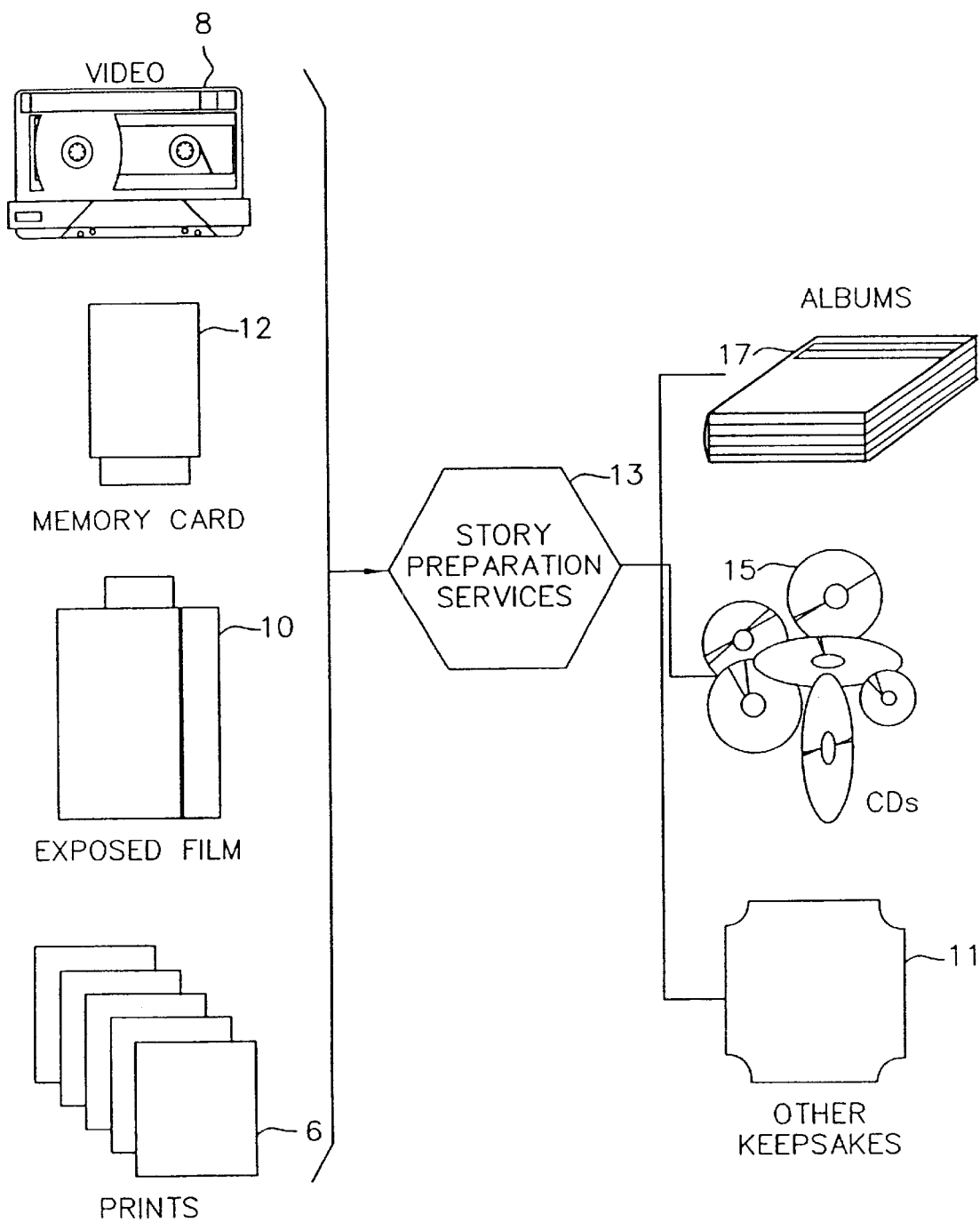
FIG. 1 is a block diagram illustrating the basic system elements used in practicing the present invention.

Referring to FIG. 1, which is the method as envisioned by the present invention designed to automatically produce photocollages including albums 17, CDs 15 and other image-based keepsakes 11. The process of transforming the supplied image material into a photocollage is referred to as Story Preparation services. Story Preparation services applies the necessary amount of image understanding embodied in a collection of processing modules executed in a non-linear sequence to create a story representation of the images. In a preferred embodiment these processing modules include: collecting, sorting, culling, annotating, grouping, enhancing, associating and, composing. These steps can be performed in the order listed or they may be rearranged in different sequences depending upon the desired output product. The production of a particular photocollage product may include one, two or, more of the available steps. Which steps are used and in what sequence is determined by the system based upon the desired product. It is important to remember that the present invention envisions providing sufficient image understanding of the subject images with the ultimate goal of teaching the system to understand that there are pervasive themes that exist within various sets of images and recognizing these themes thereby creating an image story product, or photocollage.

Figure 2:
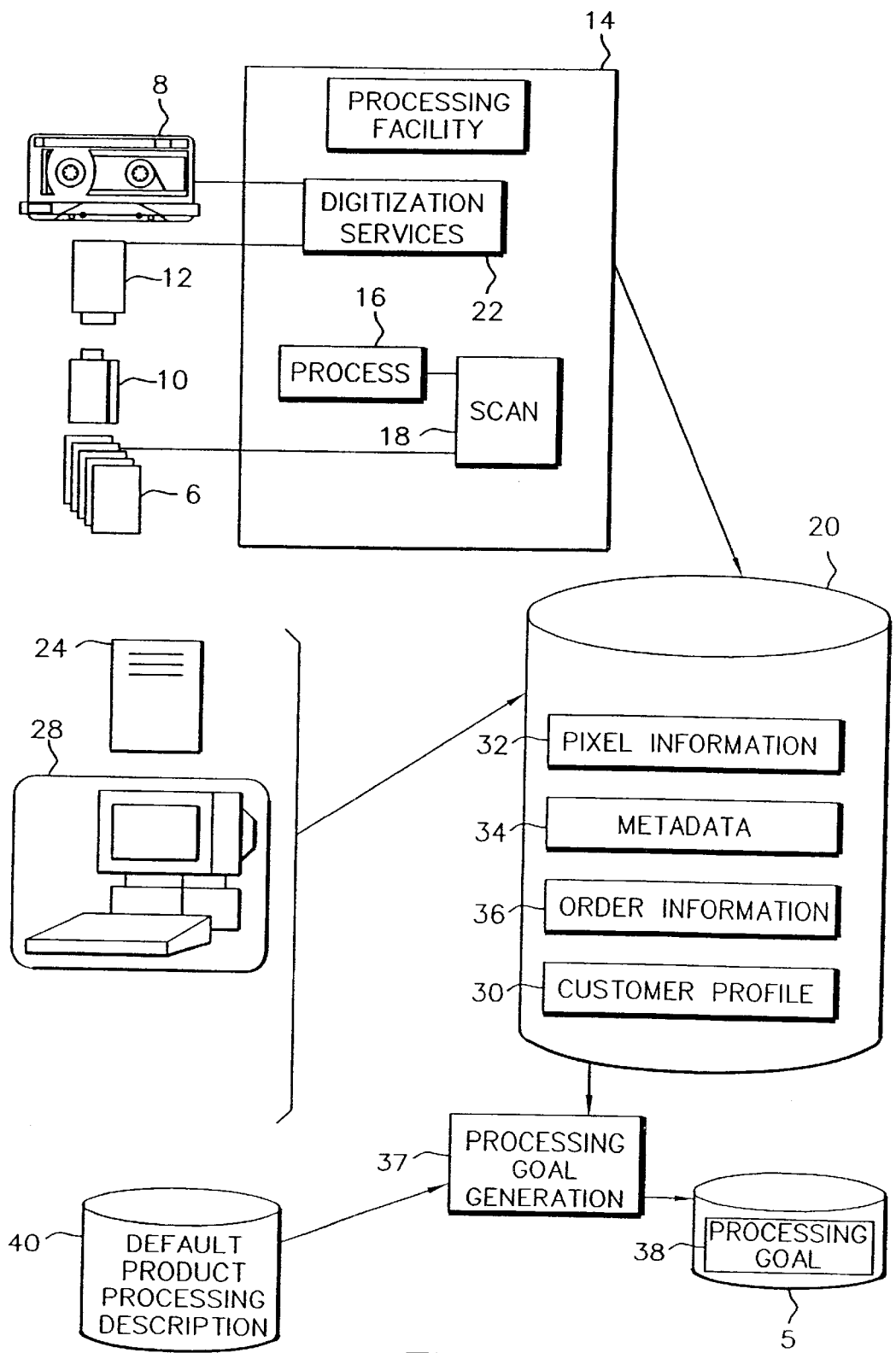
FIG. 2 is a system diagram showing the collection steps that take place once a customer has delivered images to the system.

As shown in FIG. 2, the collection step begins when a customer, having completed picture taking for one or more events delivers one or more exposed film strips or cartridges 10, digital still camera memory cards 12, photographic prints 6 or video camera media 8 to a processing facility 14. At the time that the customer delivers the exposed film cartridge(s) to the processing facility the customer's identity is recorded and associated with the suite of film cartridges and other image sources. Alternatively the customer identity may be encoded on the film by exposing a machine-readable sequence of marks along the edge of the film or by using the magnetic coating on the Advanced Photo System film. The conventional film processing takes place with conventional correction of exposed photographs to balance color and brightness and contrast. The exposed film images are chemically processed 16 to generate an optical image. These optical images are then scanned 18 to produce a high-resolution digital file that is archived in a data store 20. In general, to produce a high-resolution printed image of 8×10 inch size, a resolution of 1538×1024 pixels is required. Digital Still Camera images from Digital Still Camera memory cards that are delivered to the processing facility are digitally processed 22 to produce an equivalent digital image file of similar size and stored on the data store 20. Analog video camera images on media 8 delivered to the processing facility are digitized and processed before storage on the data store 20. At the conclusion of this step in the process there exists a collection of digital image files associated with a customer by means of a customer identification. This collection of digital image data, or pixel data 32, is now available as a source of data for the Story Services processing modules. Data attached or associated with individual images or groups of images provided by the customer such as date, time, location, sound, camera identification, customer identification, exposure parameters, Advanced Photo System IX data, are all examples of meta-data. This meta-data 34 is stored on image store 20 and associated with the available pixel data 32. In addition the customer selects the desired output product or product type from a listing of available choices. This selection may be indicated by the customer marking the photo processing bag 24, verbally indicating the desired product to a clerk or by input at a computer terminal or kiosk 28. The order description 36 generated from any one of the indicated sources provided by the customer is stored on the system and is associated, by means of a customer identification, with an existing customer profile 30 in the data store 20.

At the conclusion of the collection step the pixel data, meta-data, customer profile and order description are available as input data for the subsequent processing steps. These steps can be performed in the order listed or they may be rearranged in different sequences depending upon the desired output product. The production of a particular photocollage product may include one, two or, more of the available steps. Which steps are used and in what sequence is determined by the system based upon the desired product. Following the collection step but before subsequent processing steps are performed, the specific processing to be applied to the collected set of image material is determined in a process goal generation step 37 and embodied in a set of photocollage processing goals 38. For each of the output products requested the system determines an optimum sequence of processing steps to be applied. The processing of the output product or products will follow this system determined processing sequence, unless the sequence is modified by one of the processing modules. The processing output for each module is stated as one or more processing step goals. The processing in each step uses the stated processing step goals to control the logic, rules, and parameters applied during the processing of the collected image material to satisfy the stated processing step goal or goals. In addition to accomplishing processing goals each processing step can also create goals for itself or future processing steps. New goals, which result from executing a particular processing step, reflect necessary adjustments of desired parameters because the original goal is impossible to achieve or the processing step may generate new goals for subsequent processing steps. The initial set of processing goals 38 is determined by retrieving a default processing description from a database of available products 40 maintained by the system. . Once the initial set of processing goals is determined the photocollage processing is initiated by the system.

As described, the automatic processing of photocollages is carried out in processing modules employed to perform these image understanding and interpretation steps. Each processing module relies on data from a number of sources in order to satisfy the processing goal. Each processing module has access to five sources of data: pixel information contained in the individual images, meta-data attached to images or groups of images, the original product or service order description, the list of active processing goals maintained by the system and, a customer profile containing information about the customer. The pixel data 32 for each image provides each module with the opportunity to apply image processing and image understanding algorithms. The meta-data 34 as used herein refers to the information attached to the individual images and to groups of images will contain information about the image or group of images which originated at the time of capture or was generated in prior processing of the image or group of images. Date, time, location, sound, camera identification, customer identification, exposure parameters, Advanced Photo System IX data, are all examples of meta-data that are, in a preferred embodiment, be attached to the original input images. The original product or service order description 36 contains the specific product request from the customer and any notes that were captured in the ordering process. At any time in the processing of the image or group of images the system will have a list of active processing goals 38. Active goals are the processing goals for each processing module, which have yet to be accomplished by the system. At the start of processing this list will include the specific product or products requested by the customer, along with the translation of these product goals into system and module goals. The customer profile includes both factual and uncertain information related to the customer. The factual data would include general items such as name, address, names and ages of individuals in the household, important dates, anniversaries, product preferences and purchase history. In addition factual data such as face recognition feature vectors of the immediate family and extended family, voice training sets, handwriting samples, would also be included in the customer profile database. Uncertain information would include processing goals recommended by processing modules from previous order processing, image understanding assertions about the contents of the image or groups of images which have not been verified or other unverified information or assertions. Information and data contained in the customer profile is updated with every order processed to reflect changes in order preferences, order history and update uncertain information. In order supply the system with the necessary amount of image understanding required to arrange the images into set in accordance with themes relating to predetermined criteria that must be provided for the system to have the capability to identify attributes within the images. For example, in a preferred embodiment, if a customer requests a birthday photocollage the system will retrieve the default processing goals which indicate that the steps of collecting, sorting, culling, annotating, and composing will be involved in the processing of the requested product. In addition the processing goals for each of the modules will reflect the default attributes necessary to process a birthday product. In this example the sorting module processing goals will include a sort by date goal and a sort by content goal. The sort by date processing goal is further refined to sort the images that occur on or near a target list of dates which are determined from a list of known birthdays retrieved from the customer profile into the photocollage.

In a preferred embodiment each processing module performs processing on two distinct levels: objective and subjective. The objective processing deals with factual information about the images or groups of images or with data calculated deterministic algorithms. Examples of factual data include the size of the image, capture parameters, histograms, image transforms, etc. Commercially available software programs such as Adobe Photoshop® and Corel Draw® process images using objective data. Subjective processing deals with information that is uncertain or data is the result of non-deterministic algorithms. Often subjective results carry with them a confidence factor which allows subsequent processing steps to interpret the results. Usually subjective results occur when attempting to determine abstract information about an image or group of images. Examples of this type of the processing would be face detection, face recognition, facial expression determination, location determination, assertions, interpretations, etc. Commercially available software programs such as FaceIT© by Visionics Corp. process images to associate faces in images with names and other information. Some processing modules process only subjective information, others process only objective information and still others process both.

Figure 3:
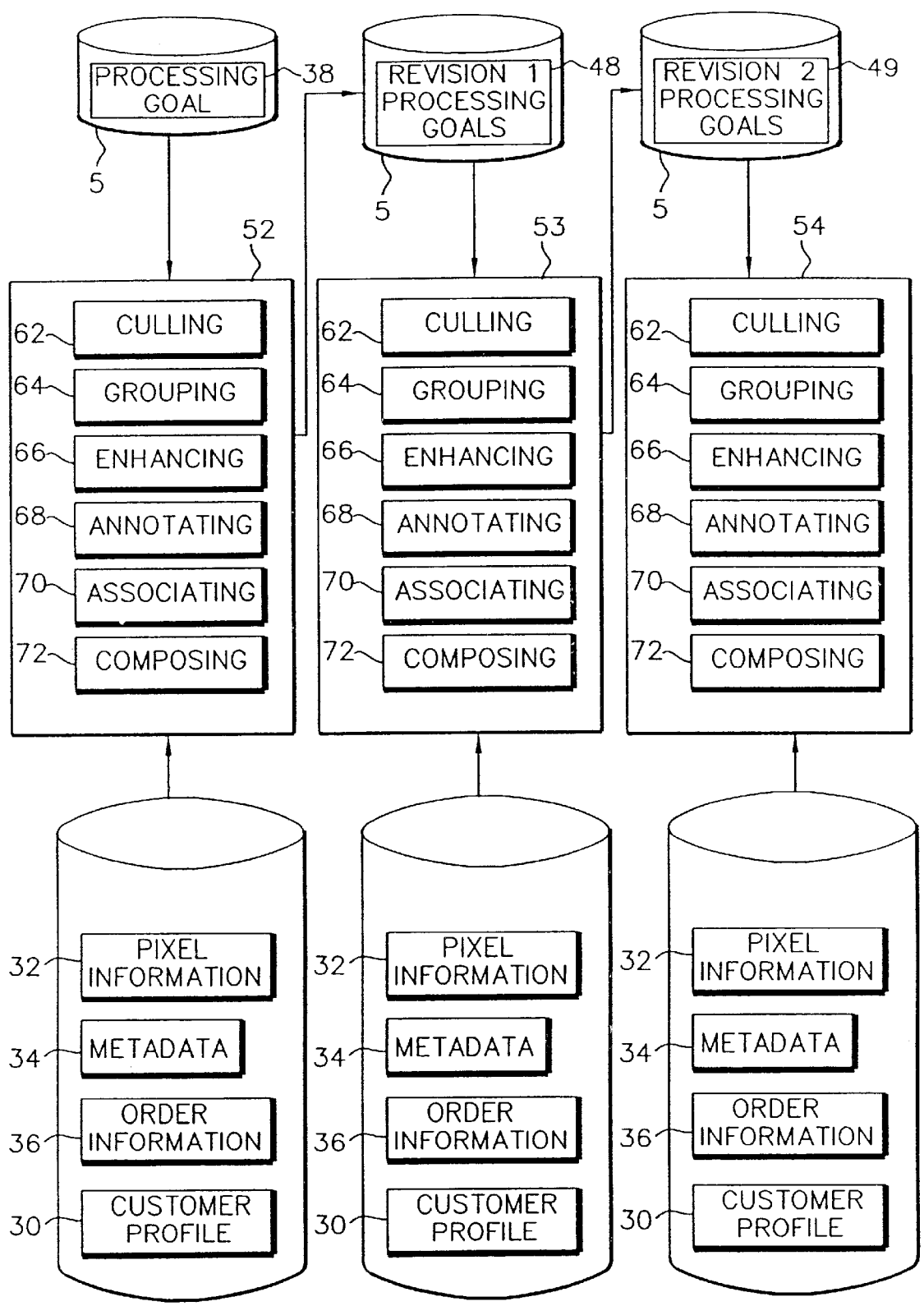
FIG. 3 is a flow diagram showing the active processing goal steps used by the system of the present invention.

As shown in FIG. 3 the processing of a photocollage is directed by the system using the active processing goals 38, 48, and 49. Because the processing goals are non-deterministic, vary by requested product and may be modified during the processing there exist a large number of possible processing sequences. The progression of processing applied to the collected image material is applied in sequential steps. Each step implements a single processing module that is intended to satisfy or partially satisfy an active processing goal. At each step in the process any one of the available processing modules (culling 62, grouping 64, enhancing 66, annotating 68, associating 70, or composing 72) may be executed. At the conclusion of the processing of a particular step the active processing goals 38 that existed before the step processing are updated to reflect the changes in goals that resulted from the execution of the processing step 52. These updated active processing goals 48 serve as the input processing goals for the subsequent processing step 53. Each of the available processing modules will be described. In addition to the processing goals 38, 48, and 49, the processing modules at each processing step have access to four sources of information: pixel data 32 contained in the individual images, metadata 34 attached to images or groups of images, the original product or service order description 36 and, a customer profile 30 containing information about the customer. This process can iterate as many times as necessary to complete the desired product objectives.

The processing of the collection of digital image material is reviewed to remove unwanted images. This step is called culling. Culling is performed on images that are deemed unwanted due to poor quality, or if there are several images that are similar in composition and only one is desired. To accomplish this culling process involves the computation of several image based metrics using the pixel data 32. These metrics fall into two basic categories: technical quality measures and abstract feature metrics. The technical quality measures would involve calculations to assess the overall sharpness of the image, exposure quality, grain quality of the image. Algorithms used to calculate technical quality measures are common in the art, examples would include: "Estimation of Noise in Images: An Evaluation" by S. I. Olson in, 55 (4), 1993, pp. 319–323 and "Refined filtering of image noise using local statistics" by J. S. Lee in *Computer Vision Graphics and Image Processing,* 15, 1981, pp. 380–389.

Images are then given an overall rating of technical quality based on the technical quality metrics. The overall image quality metric is then compared to a threshold associated with the processing goal. Images whose quality rating falls below the threshold are flagged as unwanted. The specific threshold applied to a given image or set of images is parametrically determined using the processing goal 38 and the customer profile 30 as inputs. In addition to the determination of specific objective image features, abstract subjective image features are also calculated. These subjective measures of the image allow the module to cull unwanted or unnecessary images. A typical example of images which require culling occurs when several images in the group are similarly composed and contain nearly identical content such as a group photo which is repeated several times. In order to choose the best of this group of images the digital image is analyzed to determine a quality metric composed of both objective and subjective quality features. The basis for this subjective assessment would be the presence or absence of faces, the identification of the faces in the image, the number of faces present, if the eyes are open on each face, if the subject is smiling, or orientation of the face to the camera. Examples of algorithms used to determine subjective features of an image are described in Proceedings of the IEEE Computer Society conference on Computer Vision and Pattern Recognition, June 1997. These subjective features provide clues about the subjective quality of the image. The objective and subjective features calculated for each image are combined and the images are ranked according to the relative importance of each feature analyzed to the processing goal 38 and which matches the stored customer preferences 30. The ranking, because it is partially based upon subjective information also carries a probability weighting factor. The combination of the ranking and the probability weighting factor is used to assert a decision about the quality of the image. This quality assertion is retained with the image as metadata 34 and is passed to the next processing step. In the grouping step images are grouped according to criteria derived from the analysis of the customer profile 30, the active processing goals 38 and the requested product or service 36. The goal of grouping images is to associate images that are a part of a common theme or story in the mind of the customer. Typical groupings derived from customer profiles 30 would be to associate images according to the preferred organization scheme of the customer. The attributes of typical organization schemes would include organizing by events such as birthday party, vacation, holiday, graduation, organizing by time, and organizing by people. Customer requested products 36 could also dictate grouping parameters in accordance with the product design. Examples of these grouping schemes include grouping by location in a theme park, by common life-cycle event such as graduation, by image content type such as outdoor, indoor, nature, person, group, etc. A variety of software algorithms exist which are applicable to grouping. One class of software algorithms operates on metadata 34 associated with the image where the grouping process is similar to searching a media database. Several commercial examples of media databases that allow searching are Picture Network Incorporated, Publishers Depot (www.publishersdepot.com). A second class of algorithms employed for this grouping process would include image processing algorithms which identify objects and feature sets within an image by way of the pixel information 32. These objects could represent typical cultural icons such as birthday cakes, Christmas trees, graduation caps, wedding dresses, etc. An example of such algorithms is reported by J. Edwards and H. Murase, "Appearance Matching of Occluded Objects Using Course-to-fine Adaptive Masks" in Proceedings of the IEEE Computer Society Conference on Computer Vision and Pattern Recognition, June 1997, pp. 533–546. The Product Order Information 36 can also be used in this grouping by simply stating the event or location or person on which to base the final product. The Processing Goals 38 can also be used as a grouping tool where the specific products offered mandate a specific grouping.

The annotation step seeks to generate annotation that can be composed on the story product or photocollage. Annotation is designed to provide context information about the image or group of images and assist the customer in communicating the story surrounding the images. A very common form of annotation is text associated with each image and with a group of images which explains the "who, what, when, where, and why". Such context information is generally derived from metadata 34 generated in previous processing steps, user profiles 30 or, image understanding algorithms applied in the annotation module. "Who" information may be determined using face recognition algorithms applied to the pixel data 32 tuned by the training data contained in the customer profile 30. Using a commercial product such as "FaceIt" by Visionics, a database of known faces can be retrieved from the customer profile 30 and used to guide the face recognition software. "What" information can be asserted by correlating date and time of the image capture available in the image metadata 34 with key dates contained in the customer profile 30. In addition more "what" data can also be asserted by looking within the image 32 for specific cultural icons, derived from object recognition algorithms, such as birthday cakes, Christmas trees or, graduation robes. "When" information for annotation is easily determined using metadata 34 such as date and time recorded at the time of capture. "Where" information may be provided from the capture device integrated with GPS (Global Positioning System) technology and then added to the metadata 34 for the image or it can be guessed at using image understanding algorithms which correlate known location scenes with the image content from available images 32. "Why" information is very difficult to determine without some input from the image owner via the product order information 36. The annotation, once determined, can be rendered as text, graphics, images, video or sound and associated with the individual images or with the group of images in either a traditional photocollage or digital product.

The image enhancement module applies image processing to improve the image for the intended story based purpose. Two categories of image enhancement are considered for each image. Basic image enhancements are applied to all images, as necessary, would include: red-eye removal, brightness and contrast adjustment, color adjustment, and crop and zoom to improve composition. Image enhancements are applied directly to the pixel data 32 and recorded in the image metadata 34 from the images. A second category of image enhancement is applied to the images in order to enhance their use within a story context to communicate the emotion or to support the story theme as described in the processing goal 38. For instance, selected images from a wedding story would be softened using a blur algorithm or the colors of an image could be made to match those found in a comic strip. The application of this type of enhancement processing is either specified in the product description 36 generated from the customer profile 30. All of these operations are available in image editing software programs such as Adobe PhotoShop, with the exception of red-eye removal and red-eye removal can be accomplished via the Kodak Imaging Workstation and other software such as Picture-It from Microsoft.

Some product specifications will include a processing goal to associate external content that is relevant to the product and the image content. This associated content provides additional context and interest in the final rendered product. External content takes several forms including weather reports, newspaper headlines, stock photographs, advertisements, historical references, travel brochure copy, popular music clips, video segments, etc. In order to locate and find appropriate content for the image story/photocollage the metadata 34 attached to each image and image group and is interrogated to derive searchable topics or specific information located in the customer profile 30. These search topics would focus on the when, where, what aspects of the image story. Once a series of potential search topics have been assembled they are formatted into queries and searches are performed on a variety of databases. The results of these content queries is then refined by applying priority rules from the product description database and customer preferences stored in the customer profile 30. These types of searches are common in information databases such as Yahoo® on the internet (www.yahoo.com) or from Dialog corp. If there are items within the image that can be identified with specific events (such as a wedding or birthday) or if a person can be identified from imaging algorithms, the Pixel Information 32 is used to determining the types of additional content that are added. The Processing Goals 38 dictate the forms and types of associated content that is added. The Product Order Information 36 is also a source of information regarding the association of content by a special request on the form (such as a theme park or wedding motif).

The layout processing module places the image data, annotations, and associated content into an output ready format. This layout step must be repeated for each product that was requested by the customer and for each layout goal that was generated during the processing steps. The main task involved in the layout of a multi-page photocollage is the determination of which images are to be placed in specific locations on specific pages. In addition the external content which has been associated with the individual images or groups of images must be composited onto the page. The layout process may be accomplished in numerous ways. One means of performing this processing step is to employ a parametric photocollage description. This description specifies the general structure of the photocollage but is not sufficient, of itself, to specify a final photocollage product. The description file includes photocollage features such as number of sections, size and format of individual pages, maximum and minimum number of pages allowable, maximum and minimum number of customer images allowable per page, section descriptions, cover designs, location of allowable stock content, etc. By employing a photocollage description file a variety of tailored photocollage products may be designed incorporating features specific to the design goals. The layout step begins by reading the photocollage description file to initialize a layout algorithm. The layout algorithm then works page by page and section by section to apply specific layout rules guided by the values in the photocollage description file. A variety of page/section layout algorithms could be employed which embody different design philosophies for photocollage products. The final photocollage product can be rendered on a variety of output media types which would include paper, fabric, as a digital file or on any one of a number of digital media forms such as a CD. The Processing Goals 38 are used to determine the capabilities of the specific devices being used. Customer Profiles 30 are used to determine color preferences, layout preferences, and design considerations. Metadata 34 is used to determine the placement of associated content with specific images.

Figure 4:
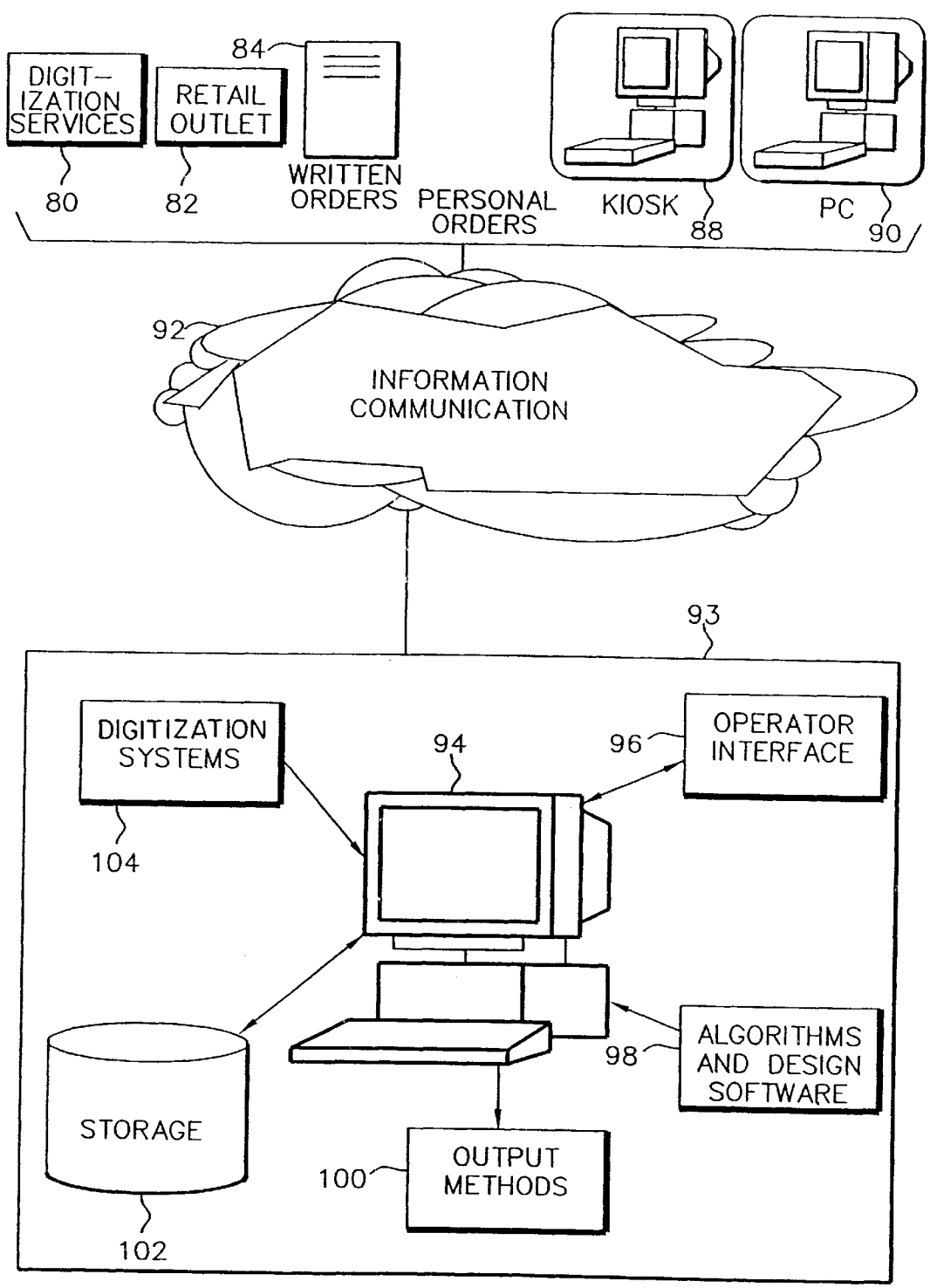
FIG. 4 is a flow chart showing the steps performed by the present invention; towards a story preparation based photocollage.

FIG. 4 shows the system diagram for Story Preparation Services. Input to the system comes from Personal Computers 90 (using albuming software such as Microsoft Picture It, Family Base from Micro Dynamics or a myriad of others), an interactive kiosk 88, via the phone or over-the-counter written order forms 84, a retail outlet 82 with links to the system, or digitization services 80 specializing in converting analog material into digital information. The information needed to perform the story services is communicated via traditional means including mail, phone, modem, Internet or other on-line services provided by information communication 92 to system 93. The components required by system 93 include a workstation 94, a digitization system for pictures, video and audio 104, a storage facility 102, an operator interface 96, algorithms and software 98 for the analysis of the data and to provide the necessary steps to complete the product, and an output delivery system 100 for printing or other media.

The invention has been described with reference to a preferred embodiment. However, it will be appreciated that variations and modifications can be effected by a person of ordinary skill in the art without departing from the scope of the invention.

PARTS LIST 6 photographic prints
8 camera media
10 cartridges
11 keepsakes
12 memory cards
14 processing facility
15 CDs
17 albums
20 data store
22 digital processing
24 processing bag
28 kiosk
32 pixel data
34 meta-data
36 order description
37 goal generation
38 processing goals
40 products
48 processing goals
49 processing goals
62 culling
64 grouping
66 enhancing
68 annotating
70 associating
72 composing
80 digitization services
82 retail outlet
84 written order forms
88 kiosk
90 personal computers
92 information communication
93 system
94 workstation
96 operation interface
98 algorithms and software
100 output delivery system
102 storage facility
104 digitization system for pictures, video and audio

What is claimed is:

1. A method of automatically producing a photocollage from a plurality of images, the method comprising the steps of:

a) obtaining a digital record of the plurality of images via a communication system, each of the digital records having a unique identifier which digital records are stored in a database;
b) automatically obtaining at least one predetermined, photocollage processing goal independent of manual input;
c) automatically translating the processing goal into a plurality of processing steps based upon a predetermined criteria;
d) automatically applying the plurality of processing steps using data from one or more of pixel data, processing goal information, or customer profile information in each step for sorting the digital records; and
e) automatically composing the photocollage from the digital records based on results on the sorting.

2. The method according to claim 1, wherein the plurality of processing steps includes employing individually or in combination culling, grouping, enhancing, annotating, associating, arranging, or composing.

3. The method according to claim 1, wherein the translating step further comprises employing a story-based model.

4. The method according to claim 1, wherein the translating step further comprises using analysis of the pixel data from one or more of the digital records.

5. The method according to claim 1, wherein the step of applying the plurality of processing steps further comprises culling records based upon analysis of pixel data for low quality and or duplicate images.

6. The method according to claim 1, wherein the step of translating further comprises using criteria which are either subjective criteria or objective criteria.

7. The method according to claim 1, wherein the step of producing a photocollage further comprises generating additional processing goals based upon partial satisfaction of previous processing goals.

8. The method according to claim 1, wherein the step (*a*) further includes scanning the images to obtain the digital records.

9. The method according to claim 1 further comprising using individually or in combination either date; time; location; Advanced Photo Standard information on exposure; sound files; or camera identification data as additional data.

10. The method according to claim 1 further comprising collecting customer order information as additional data further includes collecting customer order information.

11. The method according to claim 1 further comprising maintaining a customer profile pertinent to creating the photocollage as additional data.

12. A system of automatically producing a photocollage from a plurality of images, the system comprising:
a) means for obtaining a digital record for each of the plurality of images via a communication system, each of the digital records having a unique identifier which digital records are stored in a database;
b) means for automatically obtaining at least one predetermined, photocollage processing goal independent of manual input;
c) means for automatically translating the at least processing goal into a plurality of processing steps based upon a predetermined criteria;
d) means for automatically applying the plurality of processing steps employing data individually or in combination from one or more of pixel data, processing goal information, or customer profile information in each step for sorting the digital records; and
e) means for automatically composing the photocollage from the digital records based on results on the sorting.

13. The system of claim 12, wherein the means for processing includes means for employing individually or in combination either culling, grouping, enhancing, annotating, associating, arranging, or composing.

14. The system of claim 12, wherein the means for translating further comprises means for using analysis of the pixel data from one or more of the digital records.

15. The system of claim 12, wherein the means for applying the plurality of processing steps further comprises means for culling records based upon analysis of pixel data for low quality and or duplicate images.

16. The system of claim 12, wherein the means for translating further comprises means for using criteria that are either subjective criteria or objective criteria.

17. The system of claim 12, wherein the means for producing the photocollage further comprises means for generating additional processing goals based upon partial satisfaction of previous processing goals.

18. The system of claim 12, wherein the means for obtaining digital records further includes scanning the images to obtain the digital records.

19. The system of claim 12 further comprising means for using individually or in combination date; time; location; Advanced Photo Standard information on exposure; sound files; or camera identification data as additional data.

20. The system of claim 12 further comprising the means for collecting customer order information as additional data.

21. The system of claim 12 further comprising maintaining a customer profile pertinent to creating the photocollage as additional data.

* * * * *